March 18, 1947. H. E. ALTGELT 2,417,624
TRACTOR HITCH
Original Filed Jan. 4, 1941 2 Sheets-Sheet 1
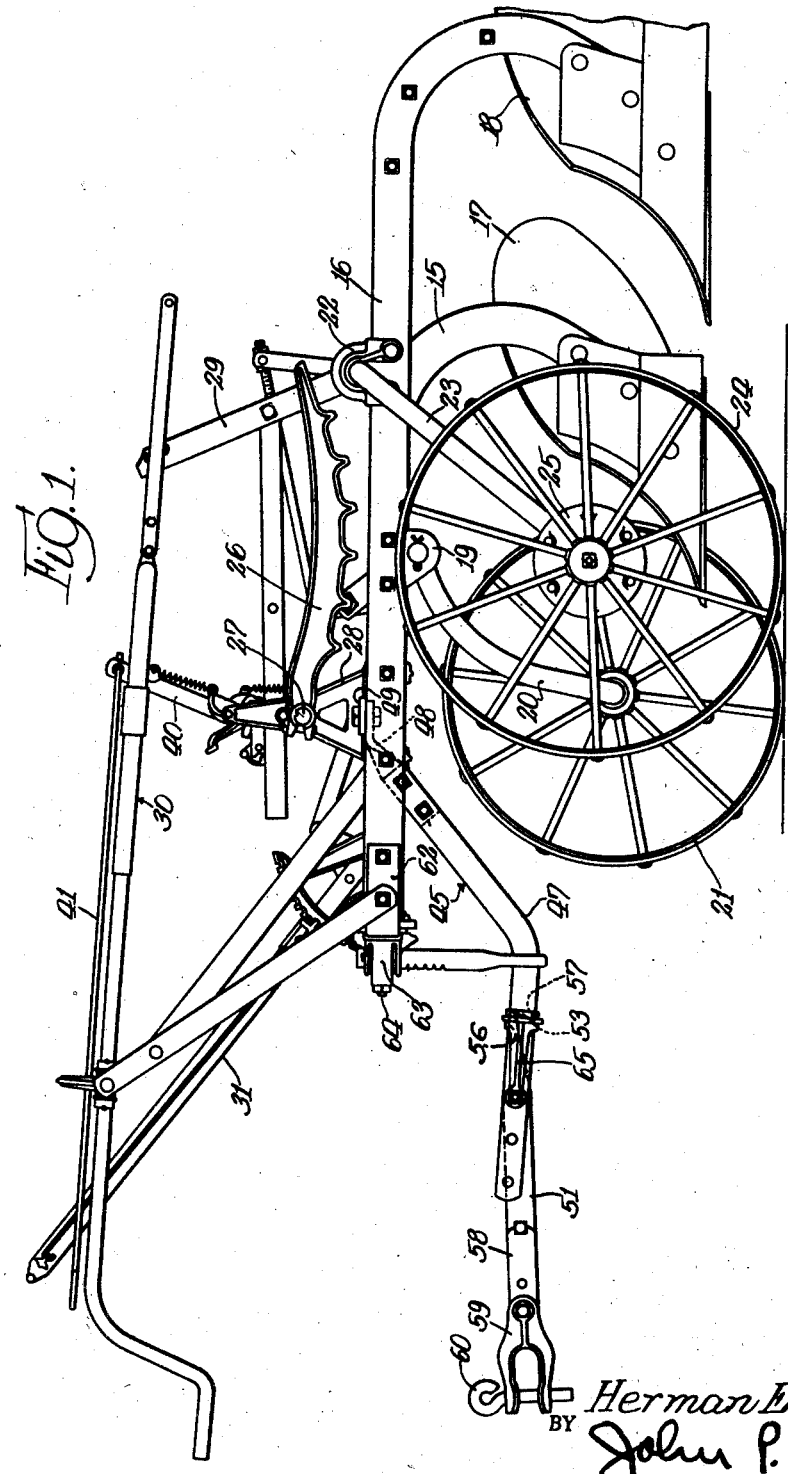
INVENTOR.
Herman E. Altgelt
BY John P. Smith Atty.

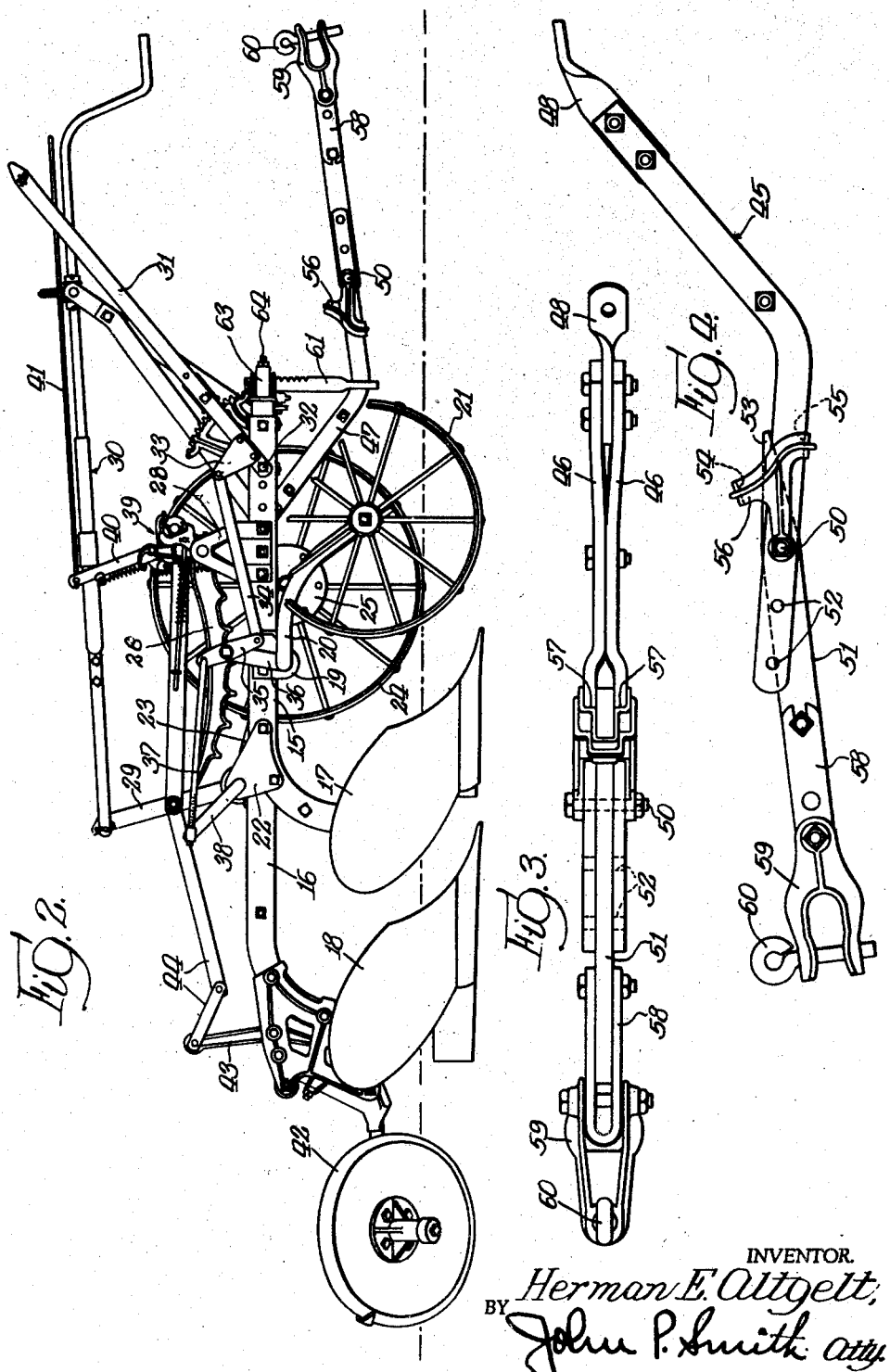

Patented Mar. 18, 1947

2,417,624

UNITED STATES PATENT OFFICE 2,417,624

TRACTOR HITCH

Herman E. Altgelt, South Bend, Ind., assignor to The Oliver Corporation, a corporation of Delaware Original application January 4, 1941, Serial No. 373,074. Divided and this application December 13, 1943, Serial No. 514,134

4 Claims. (Cl. 280—33.44)

The present invention relates generally to tractor hitches for trailing implements behind the tractor, but more particularly to a novel and improved form of an adjustable draft hitch primarily used for connecting plows to the draft bar of a variety or different types of tractors in such a manner that the controls or levers of the plow or other trailing implement are within easy accessible reach of the operator on the tractor.

Considerable difficulty has been encountered heretofore in connection with providing tractor hitches, particularly for plows, because of the fact that there is no standardization by the tractor manufacturers in the location of the operator's seat with respect to the implements attaching point on the drawbar of the tractor.

In order to overcome this situation, plow manufacturers have found it necessary to provide relatively long levers for depth regulating and leveling devices with an adjustable or telescoping arrangement so that the control levers may be shortened or lengthened to be within easy reach of the operator's seat on the tractor. This arrangement has proven to be very unsatisfactory in that long levers cause a certain vibration when the tractor and plow are drawn over rough or uneven ground, causing, in some instances, a crystallization of the steel and the breaking of the lever.

It is therefore one of the primary objects of the present invention, not only to correct the difficulties hereinbefore pointed out, but to also provide a novel and improved tractor hitch construction for plows and the like which is narrow in width so as to eliminate gathering of straw or trash thereon and which is also provided with sufficient flexibility, but limited in its up and down movement, so that if it becomes necessary to back the tractor where an obstruction is encountered by the plow or implement, the backing may be accomplished without buckling or jackknifing the hitch.

These and other objects are accomplished by providing a construction and an arrangement of the various parts in the manner hereinafter described and particularly pointed out in the appended claims.

Referring to the drawings:

Fig. 1 is a side elevational view of a plow structure supported on two wheels having my improved form of tractor hitch embodied therein;

Fig. 2 is a similar side elevational view of a plow structure supported on three wheels having my improved form of tractor hitch embodied therein;

Fig. 3 is an enlarged top plan view of my improved tractor hitch shown in Fig. 2; and Fig. 4 is an enlarged side elevational view of the same showing the same in one of its extreme pivoted positions.

The present invention is a division of my co-pending application, Serial No. 373,074, filed January 4, 1941, now Patent Number 2,359,600, issued October 3, 1944, and all detailed descriptions with respect to the plow structure may be found by reference to said co-pending application.

In illustrating one application of my improved tractor hitch, I have shown the same in connection with a plow structure which comprises briefly, longitudinally extending main frame or beam members 15 and 16 which are laterally spaced and extend parallel with respect to one another. The rear ends of each of these beam members are curved downwardly and have attached thereto in a manner well understood in the art, plow bases 17 and 18 respectively. Located in suitable bearing members 19 secured to the respective beams 15 and 16, is a crank axle 20. Journaled on the free end of the crank axle 20 is a conventional furrow wheel 21. Journaled in suitable bearing brackets 22 carried by each of the respective beams 15 and 16 and rearwardly of the first crank axle 20 is a second crank axle 23. Journaled on the outer free end of the crank axle 23 is a conventional land wheel 24. The plow bases are raised from their operative or ground engaging positions to inoperative or elevated position by a power lift mechanism which includes a pinion 25 mounted concentrically with and attached to the hub of the land wheel 24. This pinion is adapted to engage and operatively drive a curved rack 26 in order to depress the supporting wheels and elevate the plow frame. The forward end of the rack 26 is rigidly secured to a transverse shaft 27, which in turn, is journaled in the opposite bracket 28 attached to the respective main frame or beams 15 and 16. The depth penetration of the plow bases is regulated by a lever 29, the lower end of which rigidly secures the land wheel axle 23. The stop or rearward movement of the lever 29 for regulating the depth penetration is controlled by a hand screw adjusting mechanism generally indicated by the reference character 30. The leveling of the plow or relative adjustment of the land and furrow wheels with respect to each other is accomplished by a forwardly extending hand operated lever 31 which has its lower end pivoted as shown at 32 to the main frame of the plow and its upper or free end extending forwardly to be within easy reach of the operator's seat on the tractor. This leveling lever is connected by means of a bracket 33, a link 34 and an evener 35 to an upwardly extending arm 36 of the furrow wheel axle 20. The evener 35 is also connected by means of an adjustable link 37 to a crank arm 38, which in turn is rigidly secured to the land wheel axle 23.

The tripping and control mechanism for raising and lowering the rack 26 into and out of engagement with the pinion is generally indicated by the reference character 39. This mechanism comprises a series of spring actuated latches, a locking bar, a trip and associated parts, the details of which may be had by reference to my previously referred to co-pending application. Since the specific trip and locking means herein disclosed per se forms no part of the present invention, it is believed further details of the construction of the same is unnecessary except as to state that a trip lever 40 is controlled by means of a rod 41 which extends forwardly within easy reach of the operator's seat on the tractor.

The detailed construction of the plow shown in Fig. 1 and Fig. 2 of the drawings are identical except that the plow structure disclosed in Fig. 2 is provided with a rear furrow wheel 42, which in turn is connected through a crank 43 and a series of links 44 to the lever 29 for simultaneously actuating the rear furrow wheel with the other wheels when the power lift is tripped to raise or lower the plow bases with respect to the ground.

The essential feature of the present invention involves a novel type of tractor hitch which is not only narrow in construction so as to eliminate an accumulation of thrash, but also can be lengthened or shortened to afford the most convenient location to the operator's seat on the tractor so that easy access to the depth and leveling controls or levers of the plow may be obtained without the excessively long and vibrating type of levers heretofore used. This novel type hitch comprises a rear or main draft member generally indicated by the reference character 45 which is in the form of two steel bars 46 bolted together. The rear ends of these members are bent upwardly as shown at 47. Secured to the rear ends of the steel bars 46 and preferably between them is a bent draft bracket 48 which in turn, is pivotally secured to a transverse main frame member 49 of the plow. Pivotally connected by means of a bolt 50 and between the forward portions of each of the spaced apart draft members 46 is a forward or supplemental draft member 51. In order to permit adjustment of the length of the draft hitch so as to accommodate the accessibility of lever controls from the operator's seat on the tractor when the plow is used in connection with various types of tractors, a series of aligned apertures 52 are provided in the forward end of the draft members 46 so that the bolt 50 may be inserted therein to change the length of the draft hitch proper. The rear end of the supplemental draft member 51 is tapered or converges to a point as shown at 53 and the upper or lower edges of this tapered portion is adapted to engage upper and lower stops 54 and 55 respectively of a stop bracket 56 which is mounted on and held in position with respect to the draft members 45 and 51 by a bolt 50. The bracket 56 is provided with oppositely disposed shoulders 57 which rest on the upper edges of the draft members 46 so as to prevent displacement therefrom. Secured to the forward end of the supplemental draft member 51 is a U-shaped draft strap 58. Secured to the forward end of the draft strap 58 is the usual draft clevis 59 and pin 60 for connecting the draft hitch to the tractor drawbar. An intermediate portion of the draft member 45 extends through a slotted opening in a vertically extending guide or post 61. The guide 61 may be adjusted up or down or adjusted transversely with respect to a transverse frame member 62 of the plow frame. This guide member is secured in adjusted position by a clamping member 63 and bolt 64. This adjustment permits the plow to be placed in correct position not only laterally with respect to the tractor, but also permits the regulation or adjustment of the draft hitch in proper relation with respect to the drawbar of the tractor.

From the above description it will be seen that by limiting the pivotal movement of the forward end draft member 45 about its pivot 50, the rear end 53 of the supplemental draft member 51 floats between the stop 54 and 55 of the bracket 56 during the plowing operation, thereby always retaining the same freedom of vertical movement within the limits of the stops. The principal advantage accomplished by providing limited movement between these draft members is that when an obstruction is encountered by the plow, it frequently becomes necessary to back the tractor and under such circumstances, the stops limit the pivotal action between these two parts and prevents jack-knifing or buckling up of the hitch. In this connection it will be noted that when my improved type of hitch is used in connection with a two wheel type of plow, as shown in Fig. 1 of the drawings, the stops for limiting the pivotal movement of the two draft members must, of necessity, be closer together than those used in connection with a three wheel type of plow, as shown in Fig. 2 of the drawings. In the two wheel type of plow shown in Fig. 1 of the drawings, the weight is borne by the two supporting wheels and balanced by the drawbar of the tractor. The hitch used in connection with this type of plow has the same identical parts which are designated by the same reference characters except that a different type of draft or stop bracket 65 is provided which is secured in position by the bolt 50 for forming the pivotal connection between the main draft member 47 and the forward or supplemental draft member 51. This stop or draft bracket 65 is of slightly different structure than the draft bracket 56 shown in Figs. 2, 3 and 4 of the drawings. This stop bracket 56 has relatively closer positioned stops 57 and 58 which engage the rear or pointed end 53 of the supplemental draft member 51 so as to limit the free movement of the forward end of the draft hitch in the same manner and function of operation as the hitch disclosed in Figs. 2, 3 and 4 of the drawings, except that the range of movement is more restricted since the two-wheel type of plow shown in Fig. 1 of the drawings must, of necessity, be balanced from the drawbar of the tractor.

From the above description it will be noted that when the plow is raised in transporting position or the position shown in Fig. 1 of the drawings, the pointed end 53 of the draft member 51 will contact the upper stop 56 of the stop member or bracket 65 for the reason that greater weight of the plow is located rearwardly of the two supporting wheels in this plow structure. The stop arrangement in this construction of hitch also permits the tractor to be backed when the plow encounters an obstruction without buckling up the hitch as occasionally happens with hitches heretofore used.

It will be obvious from the above description that my improved type of tractor hitch provides means for not only a universal arrangement for operatively connecting implements or plows of various types to the drawbar of various types of tractors, but also permits sufficient flexibility between the implement and tractor so as to maintain the operating lever control within easy reach of the operator's seat on the tractor and yet, at the same time, permits the plow or implement to be backed by the tractor when the same encounters an obstruction without buckling up or jackknifing the hitch.

While in the above specification I have described one embodiment and an additional modification thereof which my invention may assume in practice, it will of course be understood that other modifications may be made without departing from the spirit and scope of the invention as expressed in the following claims.

What I claim as my invention and desire to secure by Letters Patent is:

1. A draft hitch for a tractor trailing implement comprising a main draft member secured to the forward end of said implement, a supplemental draft member pivoted to said main draft member, a pivot member forming the connection between said draft members, a stop bracket secured to said main draft member by said pivot member, and means whereby said stop bracket and said main draft member may be adjusted with respect to said supplemental draft member for varying the length thereof without varying the angular movement between said draft members.

2. A draft hitch for a tractor trailing implement comprising a main draft member secured to the forward end of said implement, a supplemental draft member pivoted to said main draft member, a bolt forming the pivotal connection between said draft members, a bracket secured to said main draft member by said bolt, oppositely disposed stops formed on said bracket for limiting the angular displacement between said draft members, and means whereby said bracket and supplemental member may be adjusted with respect to said main draft member for varying the length of said hitch without varying the pivotal movement between said draft members.

3. A draft hitch for a tractor trailing implement comprising a main draft member secured to the forward end of said implement, a supplemental draft member pivoted to said main draft member, a pivot pin forming the connection between said draft members, there being a plurality of spaced apart apertures in one of said members for varying the effective length of said members, and means mounted on one of said members for limiting the pivotal movement of said members within constant angular displacement regardless of the adjusted position between said members.

4. A draft hitch for a tractor trailing implement comprising a main draft member secured to the forward end of said implement, a supplemental draft member pivoted to said main draft member, a pivot pin forming the connection between said members, there being a plurality of spaced apart apertures in one of said members for varying the effective length of said members, and a stop bracket adjustably secured to one of said members by said pivot pin for limiting angular movement of one of said members with respect to the other of said members.

HERMAN E. ALTGELT.

REFERENCES CITED

The following references are of record in the file of this patent:

UNITED STATES PATENTS

| Number | Name | Date |
| --- | --- | --- |
| 1,686,545 | Altgelt | Oct. 9, 1928 |
| 1,943,594 | Flatley | Jan. 16, 1934 |
| 1,471,548 | Clement | Oct. 23, 1923 |
| 1,574,351 | Altgelt | Feb. 23, 1926 |
| 2,327,308 | Johnston | Aug. 17, 1943 |